Feb. 7, 1928. 1,658,134
C. C. McDERMOTT
HEAT SUPPLY CONTROL
Filed Feb. 19, 1923 3 Sheets-Sheet 1
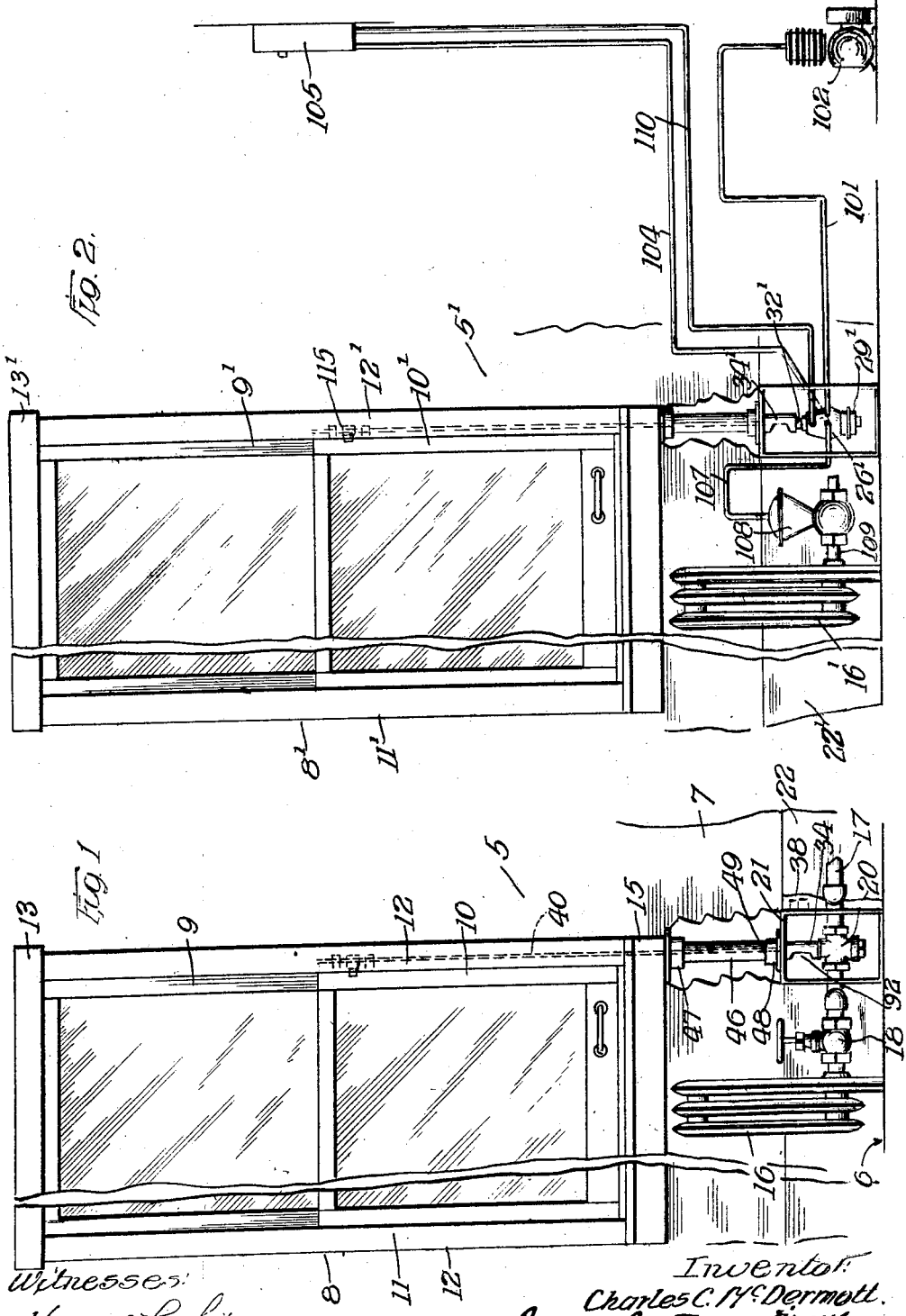

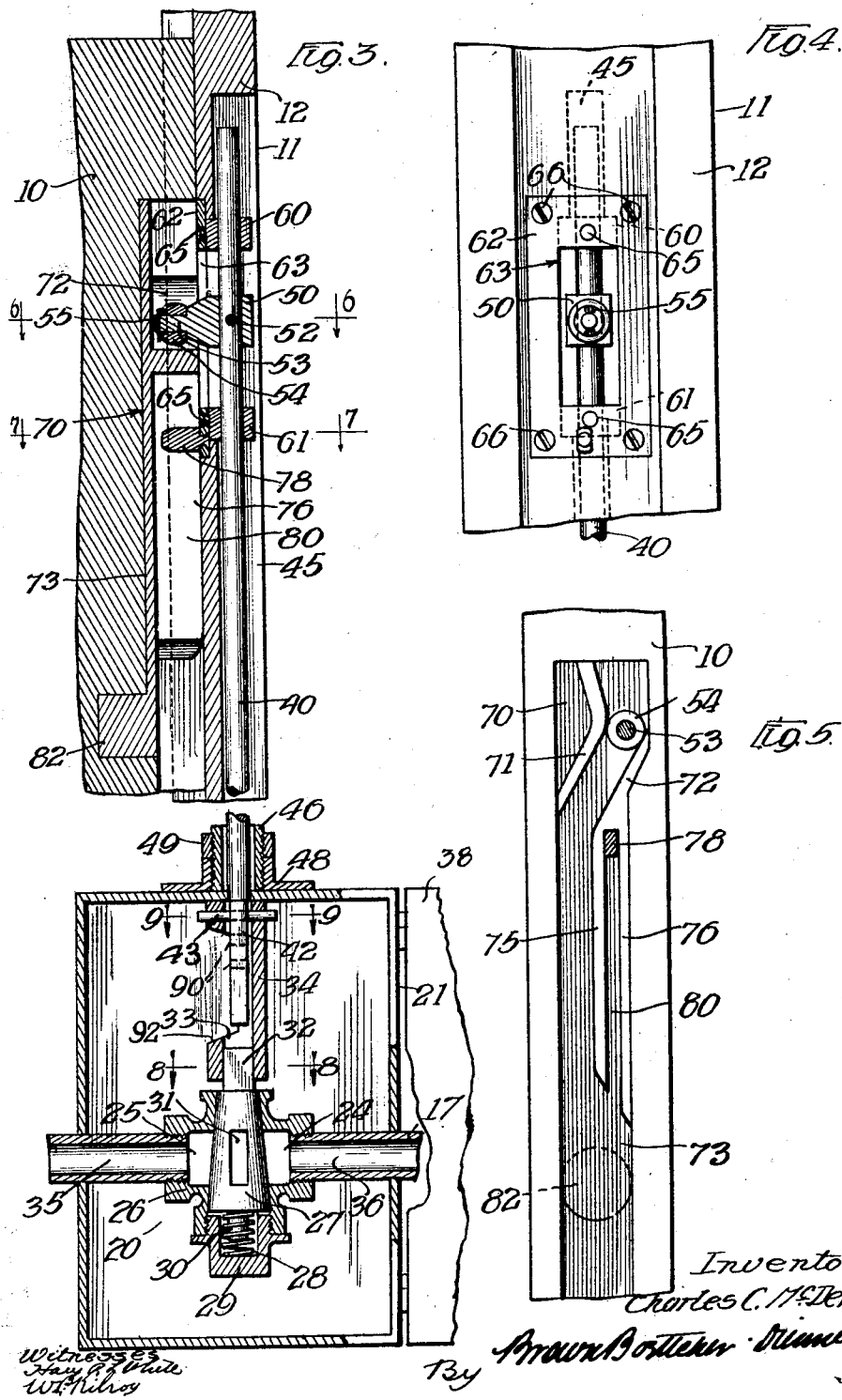

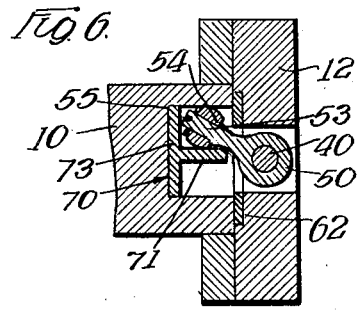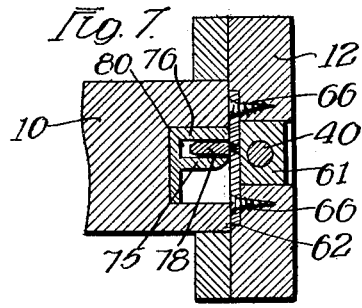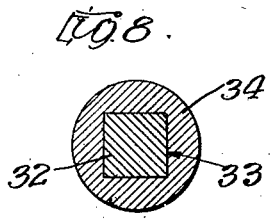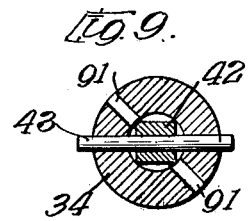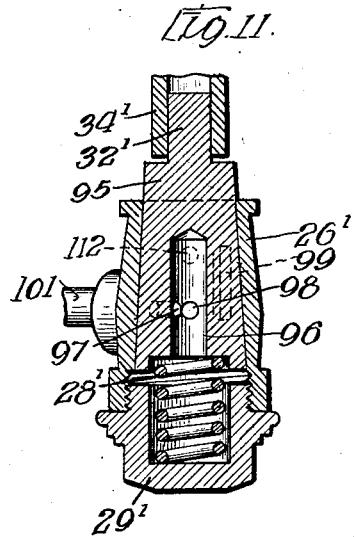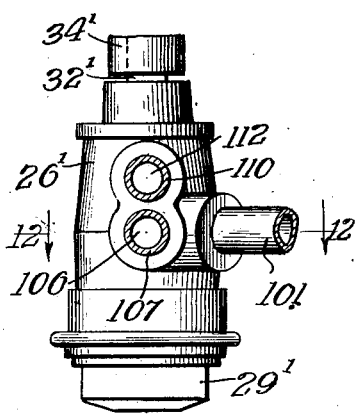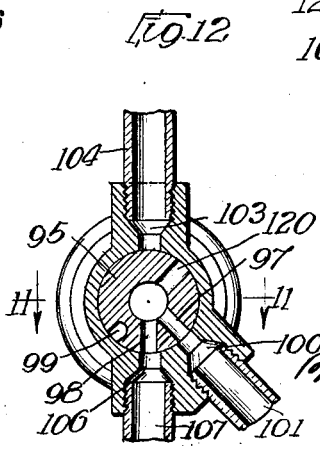

Patented Feb. 7, 1928.

1,658,134

UNITED STATES PATENT OFFICE.

CHARLES C. McDERMOTT, OF CHICAGO, ILLINOIS.

HEAT-SUPPLY CONTROL.

Application filed February 19, 1923. Serial No. 619,818.

My invention relates to the art of heating and ventilating.

In its broader aspect the problem with which I am concerned is that of so controlling the supply of heat to a room, for example, that heat losses will be minimized and the heat conserved where it would otherwise be dissipated needlessly or at too great a rate. The specific problem with which I am concerned is that of controlling heat losses, due to ventilation, to conserve the heat which would otherwise be lost, for example, when a ventilating device, such as a window, is made active and puts an artificial demand upon the heating device or heat supplying means.

Heat losses through open windows and in continuing and even establishing a heat supply when a window or other ventilating device is made active, when an artificial demand is imposed, or where the heat is dissipated needlessly or at too great a rate or the rate of loss exceeds a predetermined value, result in fuel waste, inefficiency and increased cost. This waste and increased cost is great and has come to be a difficult practical problem especially in office buildings, hotels and other large buildings. While changing air is desirable it is not necessary to have the heat on and the windows very far open at the same time, yet it is impossible to regulate the tenants so that they will close off the heat in opening the windows beyond a certain point. The greater the number of tenants the greater the heat losses and fuel waste in this manner.

In my co-pending application Serial No. 584,421 filed Aug. 26, 1922, I have disclosed a method of conserving the heat and controlling heat losses which comprises automatically cutting off the supply when the heat loss, the heat output, the heat input or the demand exceeds a predetermined value and more specifically when the heat demand is artificially increased as it would be by opening a window or rendering any other ventilating device active. Considering a temperature change about the only natural source of heat demand variation the system disclosed in that application provides for controlling the supply automatically with a variation in demand from any other source, more particularly for cutting off the heat supply automatically with an artificial increase in demand.

The particular means described in the aforesaid application includes a valve for the radiator or heat supply line, the closing of which valve is controlled by means controlled by opening of the window. The radiator valve governs the heat supply and it is in turn controlled by means controlled by the window. In my co-pending application Serial No. 586,255 filed Sept. 5, 1922, a valve for controlling the radiator is actuated by opening of the window. The valve actuated by opening of the window controls a valve at the radiator and the valve at the radiator in turn governs the heat supply.

According to one phase of my present invention the radiator or heat supply is governed by a valve, specifically by a valve in the heat supply line, and that same valve is actuated by opening the window or rendering of a ventilating or other artificial demand varying means active.

Another feature of my present invention is the provision of an improved valve operating means. While this valve operating means is particularly adapted for operating the valve which governs the radiator or heat supply, it is not limited to use in such connection but is adapted for operating a valve which in turn controls a valve at the radiator as set out in connection with the second of my aforesaid co-pending applications.

The valve operating means of my present invention, whether it operates a valve at the radiator or a control valve for a valve at the radiator, permits arrangement of the window actuated valve remote from the window for convenient installation and authorized access as distinguished from arrangement of said valve adjacent one of the vertical sides of the window. It permits arrangement of the valve down in the baseboard about the floor or in the wall below the window, for example, which mounting I find is better accommodated by the various types of building structures and window arrangements.

I provide for positively actuating the window controlled valve by the window in opening, as distinguished from a valve actuated by a spring upon being released by opening of the window. I also provide for positively opening the valve or returning it to its normal position in closing the window. Adjustment of the window opening at which the valve operates and preclusion of unauthorized access to said adjustment is also provided for. Other more specific provisions will hereinafter appear.

In order to apprise those skilled in the art with the construction and operation of my present invention I shall now describe certain specific embodiments of the invention in connection with the accompanying drawings which form a part of the present specification.

In the drawings:

Figure 1 is a fragmentary and more or less diagrammatic view looking from the inside of a room and showing a ventilating device, a source of heat supply and an embodiment of my present invention in connection therewith.

Figure 2 is a similar view of a modification.

Figure 3 is an enlarged fragmentary vertical longitudinal section through the window frame, valve actuating sash, valve and valve operating means shown in Figure 1.

Figure 4 is a fragmentary elevational view of the inner face of one of the upright portions of the window frame showing the mounting of the valve actuating rod therein.

Figure 5 is a fragmentary elevational view of the adjacent edge of the valve actuating sash showing the mounting of the valve actuating member therein.

Figure 6 is a horizontal cross section taken on line 6—6 of Figure 3.

Figure 7 is a horizontal cross section taken on line 7—7 of Figure 3.

Figure 8 is a horizontal cross section taken on line 8—8 of Figure 3.

Figure 9 is a horizontal cross section taken on line 9—9 of Figure 3.

Figure 10 is a front elevational view of the window actuated valve shown in Figure 2.

Figure 11 is a vertical section through said valve on line 11—11 of Figure 12 and;

Figure 12 is a horizontal section on line 12—12 of Figure 10.

Referring first to Fig. 1, 5 designates generally a room having a floor 6 and wall 7, said wall having a window 8 comprising upper and lower sashes 9 and 10 respectively mounted in a frame 11. Window frame 11 comprises upright frame portion 12 connected by an upper horizontal frame portion 13 and a lower horizontal frame portion or sill 15.

Room 5 is provided with a heating device, specifically a radiator 16, mounted in the particular embodiment shown upon floor 6 and supplied by a heat supply line, specifically a steam or heat supply pipe or conduit 17, provided adjacent radiator 16 with the usual or any suitable or preferred manually operable valve 18.

Connected into the supply pipe or conduit 17 just ahead of valve 18 is a valve 20 disposed in a box 21. Box 21 is preferably mounted in the base-board 22 and upon floor 6 as shown although of course it may be mounted in the wall above the floor or otherwise should the particular installation make it desirable. The pipe line 17 is offset as through suitable elbows as shown back into base-board 22 and the offset portion of said line in separated to receive valve 20, the adjacent ends 36 and 35 of pipe 17 being connected to the inlet 24 and outlet 25 of said valve 20 as shown in Figure 3.

Valve 20 comprises a casing or body portion 26 having in addition to inlet 24 and outlet 25 a tapered bore in which a correspondingly tapered valve member 27 is rotatably mounted, tight seating of valve member 27 being maintained by a coiled spring 28 interposed between the lower end of valve member 27 and a plug 29 threaded into the lower end of valve casing or body 26. An integral stud 30 projects from the lower end of valve member 27 into coiled spring 28. Valve member 27 is provided with a passage 31 diametrically therethrough, which passage when rotated into register with inlet 24 and outlet 25 places the adjacent ends 35 and 36 of pipe line 17 in communication and permits a flow of steam or other heating medium through the valve to the radiator or other heating device.

An angular stud 32 projects from the upper end of valve member 27 and engages in an angular or square socket 33 in the lower end of a coupling sleeve 34 to connect said sleeve 34 and valve member 27 for rotation together. Adjacent valve 20 the pipe ends 35 and 36 of the heat supply line 17 extend through openings in the side walls of box 21. Box 21 thereby in addition to enclosing the valve and all connections therewith supports the pipe line 17 adjacent valve 20, holding the valve and associated connections properly positioned and the pipe line against sagging at that point. Disalignment of the parts in moving the radiator as in decorating for example is at the same time thereby prevented. Of course when the box is otherwise arranged the valve 20 and the adjacent portion of the pipe line 17 may be otherwise supported or held properly in place.

Box 21 is preferably provided with a cover 38 shown fragmentarily in open position in Figure 3. This cover may be hinged to the box or otherwise arranged for positioning over the open access face of the box and is preferably provided with a suitable lock for preventing unauthorized access to the interior of the box.

The valve operating means in this particular embodiment is shown connected for actuation by the lower window sash 10. It may of course be installed for operation by the upper sash instead or it may be applied for actuation by opening movement of either sash. This connection comprises a rod 40 having an angular or squared lower end 42 projecting through the top of box 21 and loosely into the upper end of coupling sleeve 34 and connected to sleeve 34 by a pin 43 to rotate sleeve 34 upon rotation of rod 40. The upper end of coupling sleeve 34 abuts the top of box 21. Rod 40 extends up into and through a vertical groove 45 in the outer face of upright frame member 12. That portion of rod 40 between box 21 and sill 15 is incased in a tube or sleeve 46. A collar 47 on the upper end of said tube 46 engages beneath sill 15. A similar collar 48 threaded upon the lower end of tube 46 engages the top of box 21, a nut 49 being preferably provided for locking collar 48 in place.

Adjacent its upper end rod 40 is rotatably journaled in a pair of spaced bearing arms 60—61 carried by a mounting plate 62 and projecting from the upper and lower ends respectively of an opening 63 in said plate into groove 45 in window frame 12. The face of frame member 12 to which plate 62 is secured by screws 66 is recessed to permit plate 62 to set in flush with or within said surface so as not to interfere with the operation of the window sash. Bearing arms 60—61 are secured to plate 62 by headed studs 65.

Between arms 60—61 the upper end of rod 40 carries an arm 50. Arm 50 is fixed against relative rotation and longitudinal movement on rod 40 by a pin 52. The outer end of arm 50 terminates in a stud 53 upon which stud an anti-friction roller 54 is mounted. Roller 54 is held against displacement by a washer and cotter pin 55. The adjacent edge of sash 10 is provided with a longitudinal recess or groove 70 in which groove the operating or valve actuating member 73 is mounted.

Operating member 73 comprises a plate having projecting oblique cam flanges 71—72 between which roller 54 engages to be cammed in one direction with an accompanying rotation of rod and valve member 27 upon opening the window and in the opposite direction with an accompanying rotation of rod 40 and valve member 27 in the opposite direction upon closing the window. In this manner rectilineal movement of the window or sash rotates valve member 27 and closes or opens the valve automatically with the movement of the window sash.

Oblique cam flange 72 merges at its lower end into a pair of parallel vertical flanges 75—76 which define a vertical guide-way 80. A guide pin 78 carried by plate 62 projects into guide-way 80 and holds the parts properly positioned relative to each other, especially during the camming or actuating operation. Downward or closing movement of the window sash is positively limited by engagement of pin 78 with the upper end of guide-way 80 as shown. The lower end of plate 73 is provided with a boss 82 which projects into a recess in sash 10 to maintain the cam actuating or operating plate properly positioned. I do not, of course, intend to be limited to the specific mounting of the operating plate shown and the other details and arrangements will vary especially with different installations. By extending rod 40, for example, and positioning the operating or actuating connections at the upper sash the heat supply may be controlled by the upper sash, or by extending rod 40 and providing an additional actuating connection between it and the upper sash the supply may be controlled by movement of either sash.

From the foregoing it will now be apparent that upon opening the window the cam flange 72 forces or cams roller 54 to the left (Fig. 5) turning valve member 27 and the port opening 31 therethrough out of register with inlet 24 and outlet 25 to close the valve and cut off the heat supply to the radiator. In closing the window cam flange 71 forces or cams roller 54 to the right turning valve opening 31 back into registration with inlet 24 and outlet 25 to reestablish supply to the radiator or at least to valve 18 through which the radiator may be manually controlled as desired. In Fig. 5 the parts are shown in the position occupied when the window is closed. In Fig. 3 the window has been opened or raised sufficiently to cut off the supply to the room.

The squared lower end 42 of rod 40 is provided with vertically spaced openings 90, the pin 43 being removable and insertable through either of openings 90 upon registration of same with the diametrical opening through the upper end of sleeve 34. This permits vertical adjustment of the arm 50 and its roller 54 to change the point of window opening at which the valve 20 is actuated. In Fig. 9 I have shown an adjustment opening 91 in the sleeve 34. Assuming substantially a 90 degree rotation is necessary in moving valve member 27 to closed position from its alignment with pipe ends 35 and 36 when open, then by removing pin 43 turning valve 45 degrees in the direction of its closing movement and inserting pin 43 through opening 91 and the opening in rod 40, only 45 degrees further rotation will be necessary to close the valve the seats being formed to maintain the valve closed during the remainder of its 45° movement. Less movement of the window will be required and the point of window opening at which the supply is controlled or cut off will be lowered. Through either or both of these adjustments the valve may be operated at a relatively small, relatively large or any intermediate window opening. Coupling sleeve 34 is cut away at 92 to permit convenient access therethrough for the purpose of adjustment.

In Fig. 2 I have shown the operating mechanism embodied in the type of system shown in my co-pending application Serial No. 586,255 filed September 5, 1922. In this embodiment the socket at the lower end of coupling sleeve 34' engages over an angular stud 32' projecting from the upper end of a rotatable valve member 95. Valve member 95 is tapered as before and is rotatably mounted in a correspondingly tapered bore in the valve casing or body portion 26' being tightly seated therein by a coiled spring 28' interposed between the lower end of the valve member and a plug 29' threaded into the lower end of valve casing 26'.

Valve member 95 is provided with an axial chamber 96 from which passages 97 and 98 extend radially through the valve member and a longitudinal passage 99 is provided in the periphery or outer surface of said valve member as shown. The valve body or casing 26' is provided with a fluid pressure inlet 100 connected through a pipe or conduit 101 with a source of compressed air supply for example shown diagrammatically as a compressor 102. A port 103 in valve casing 26' leads from the valve by way of a pipe line or conduit 104 to a thermostat 105 positioned to automatically maintain a uniform temperature in the room and a port 106 leads from the valve by way of a pipe or conduit 107 to a pressure controlled valve 108 in the heat supply line 109 to radiator 16'. A return line 110 from the thermostat 105 enters the window controlled valve by way of a port 112 superposed above port 106.

Valve member 95 is shown in Fig. 12 in the position into which it is rotated by opening of the window through the operating or actuating connection described specifically in connection with Fig. 1. In this position passages 97 and 98 connect the source of fluid pressure supply 102 with pressure operable valve 108 in the steam line to the radiator. The resulting fluid pressure flow to valve 108 closes said valve and cuts off the heat supply to the room. When the window is closed and valve 95 is rotated to its normal position through the operating connection 115, passages 97 and 98 are moved out of register with ports 100 and 106 and passage 99 is moved into register with the superposed ports 106 and 112. At the same time passage 98 is moved into register with port 100 and another passage 120 is moved into register with port 103 leading to the thermostat.

The air or other fluid under pressure now passes to the thermostat by way of passages 98 and 120 and pipe line 104, where its flow to the pressure valve 108 by way of pipe line 110, port 112, passage 99, and pipe line 107 is controlled by temperature changes in the room in the usual or any preferred manner. The thermostat 105 may be set to cut off the pressure supply to valve 108 through the above course when the temperature drops to a predetermined point whereupon valve 108 opens and establishes a supply of heat to the radiator. When the temperature rises to a predetermined point the thermostat operates to establish a pressure supply to valve 108 to close said valve 108 and cut off the heat supply to radiator 16'. The thermostat preferably operates so that in turning off the pressure supply the line from the thermostat to the control valve will be opened to permit exhausting of the pressure therein. When the pressure supply is reestablished at that point the line from the thermostat to the control valve is closed and a pressure supply is set up through said line.

It is to be noted that when valve plug 95 is positioned with passage 99 registering with ports 112 and 106 said passage connects said ports and at the same time the fluid pressure from source 102 is allowed to escape through the valve of the thermostat when the same is opened to exhaust the pressure in the line 110 from the thermostat to the control valve.

Should a fluid pressure control system be desirable without the thermostatic control, the thermostat may of course be omitted or it may be replaced by a manually controlled valve or by any other suitable or preferred automatic temperature controlled valve.

As already pointed out the feature of providing a valve in the heat supply line for governing the heat supply to the room and actuating that same valve by opening the window, and the means for operating the valve whether that valve be in the heat supply line, or whether it in turn control a valve in the heat supply line or be otherwise arranged, together with the structural improvements, arrangement and disposition of the parts made possible and the provisions for adjustment are highly important aspects of my present invention.

I do not intend to limit the invention to all of the details nor to the particular embodiment of the essential features shown and described.

I claim:

1. In a room the combination of a radiator, a window including a frame, a heat supply line for the radiator, a valve interposed in the heat supply line and governing the heat supply to the radiator, a rotatable valve operating member, said rotatable valve operating member being journaled in said window frame, and a mechanical connection between the window and said valve member for turning the valve member by the movement of the window in each direction.

2. In a room, a heating device, a heat supply line therefor, a valve interposed in the supply line and governing the heat supply to the heating device, a window, said window comprising a frame and a sash, a valve operating member extending thru the window frame and connected to operate the valve in the heat supply line, and an actuating member carried by the sash and cooperable with said operating member to convert motion of translation of the window into rotary movement and impart said movement to the valve to close same by the opening movement of the window.

3. In a room a heating device, a valve for controlling said heating device and a window, said window comprising a frame and a sash, a valve operating member extending through the window frame, an actuating member carried by the sash, an arm projecting from said valve operating member into cooperation with said actuating member, said actuating member having oblique cam portions for actuating said arm and cooperating guide means between the window frame and said actuating member.

4. In a room, a heating device, a valve for controlling said heating device, and a window, said window comprising a frame and a sash, a valve operating member extending through the window frame, an actuating member carried by the sash, an arm projecting from said valve operating member into cooperation with said actuating member, said actuating member having a cam portion for actuating said arm and also having a guideway, and a guide pin projecting from the window frame into said guideway.

5. In a device of the class described, a window, a recess in the said window, a plate associated with the window, cam flanges projecting from said plate, a valve actuating member cooperable with said flanges, a guideway in which the said member is adapted to move, and a projecting boss for cooperation with the said recess, the said boss being formed on the said plate.

6. In a room, a heating device, a valve for controlling said heating device, controlling means for said valve, and a coupling between the valve and said controlling means, said coupling providing an adjustable connection between the valve and said controlling means and being cut away to permit access for adjustment.

7. In a room, the combination of a radiator and a window, said window comprising a frame and a sash, a valve controlling the radiator, a valve operating member mounted in the window frame, means carried by the window sash for actuating said operating member and cooperating means between said actuating member and the window frame for holding the frame and the actuating member against relative bodily movement during actuation of the valve operating member.

8. In combination, a radiator, a heat supply line therefor, a radiator controlling valve in said line, a window, an operating rod extending vertically along one side of the window, a rod actuating member on the adjacent side of the window, said member having lateral engagement with the rod along the side of the window to actuate said rod with the movement of the window, and a connection between said rod and the radiator valve for operating said valve by the actuation of the rod.

9. In combination, a radiator, a valve therefor, a window, a valve operating member having connection at its lower end with the radiator valve, and having lateral connection with the side of the window to be actuated thereby, and operate the valve with the movement of the window, and means for varying the point at which the valve operating member will be actuated by the window.

10. In a room, a heating device, a valve for controlling said heating device and a window, said window having a sash, a valve operating member connected to operate the valve and extending along one side of the sash in the direction of its movement, and an actuating member on the adjacent side of the sash, one of said members having a lateral projection engaging the other member along the side of the sash to actuate the valve operating member with the movement of the sash.

In witness whereof, I hereunto subscribe my name this 16th day of February, 1923.

CHARLES C. McDERMOTT.